3,417,396
MOVING TARGET INDICATION SYSTEM USING A STAGGERED REPETITION RATE
Francis J. Stifter, Natick, and William W. Shrader, West Newton, Mass., assignors to Raytheon Company, Lexington, Mass., a corporation of Delaware
Filed Nov. 1, 1967, Ser. No. 679,911
6 Claims. (Cl. 343—7.7)

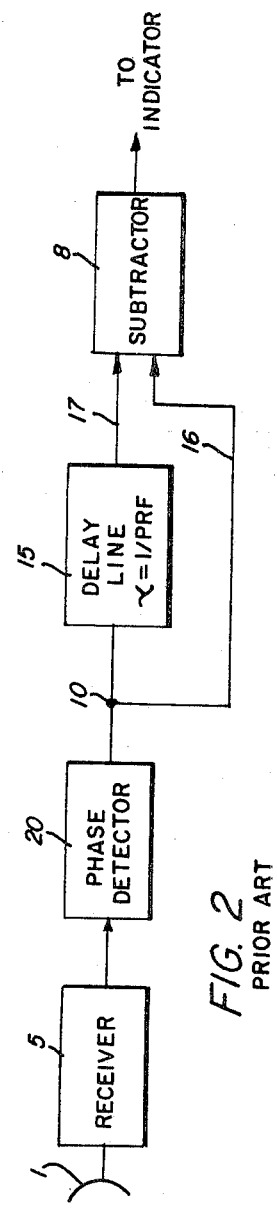

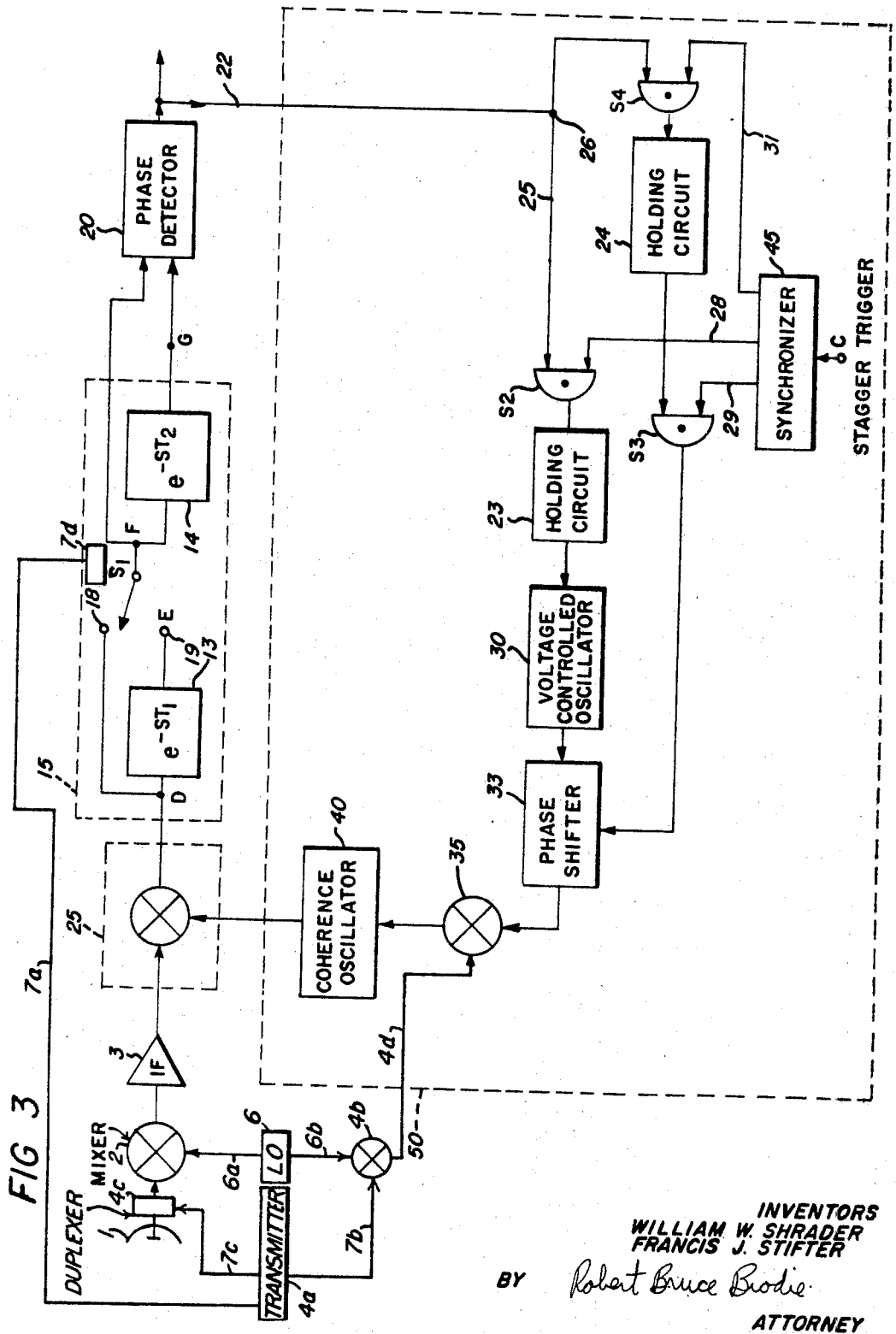

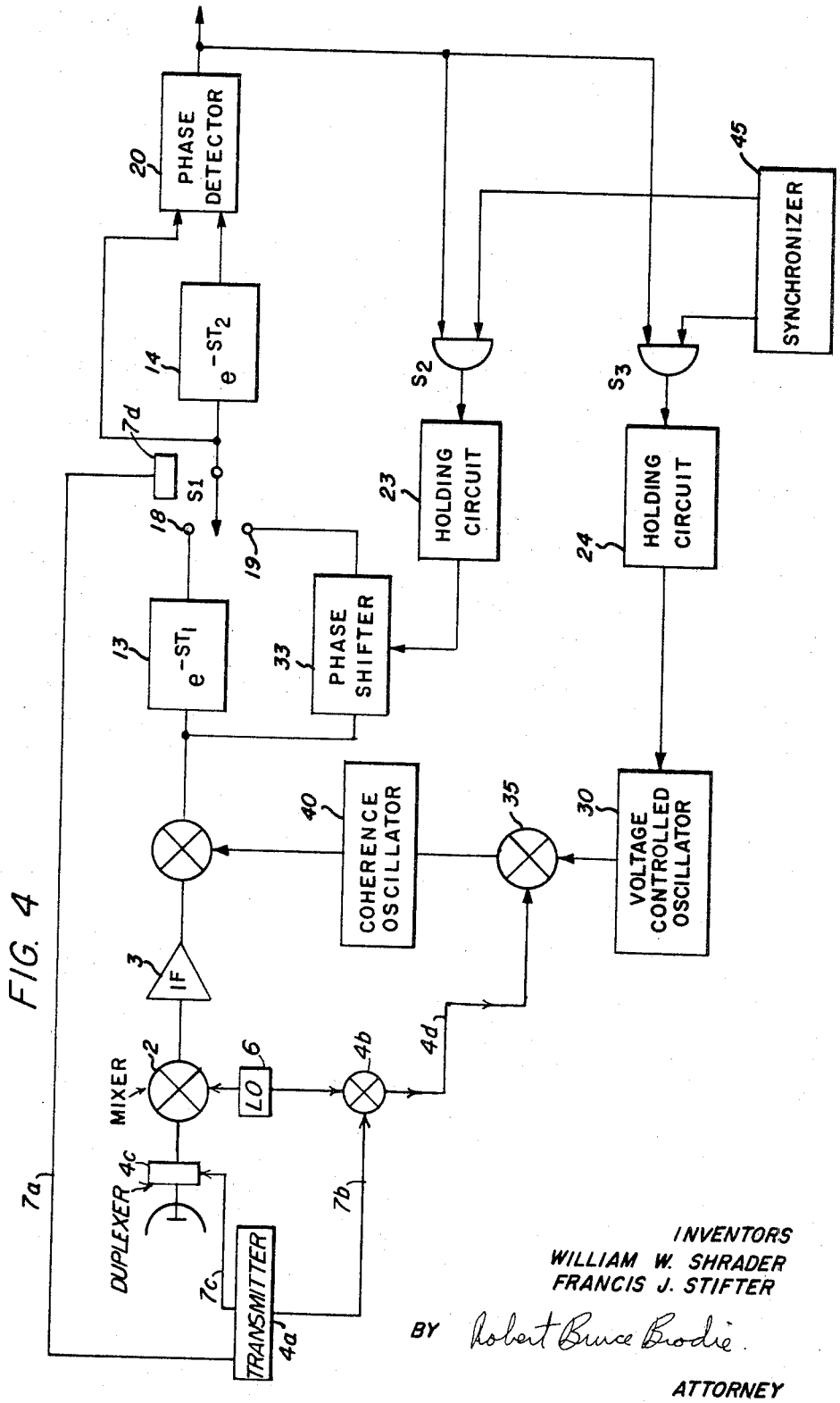

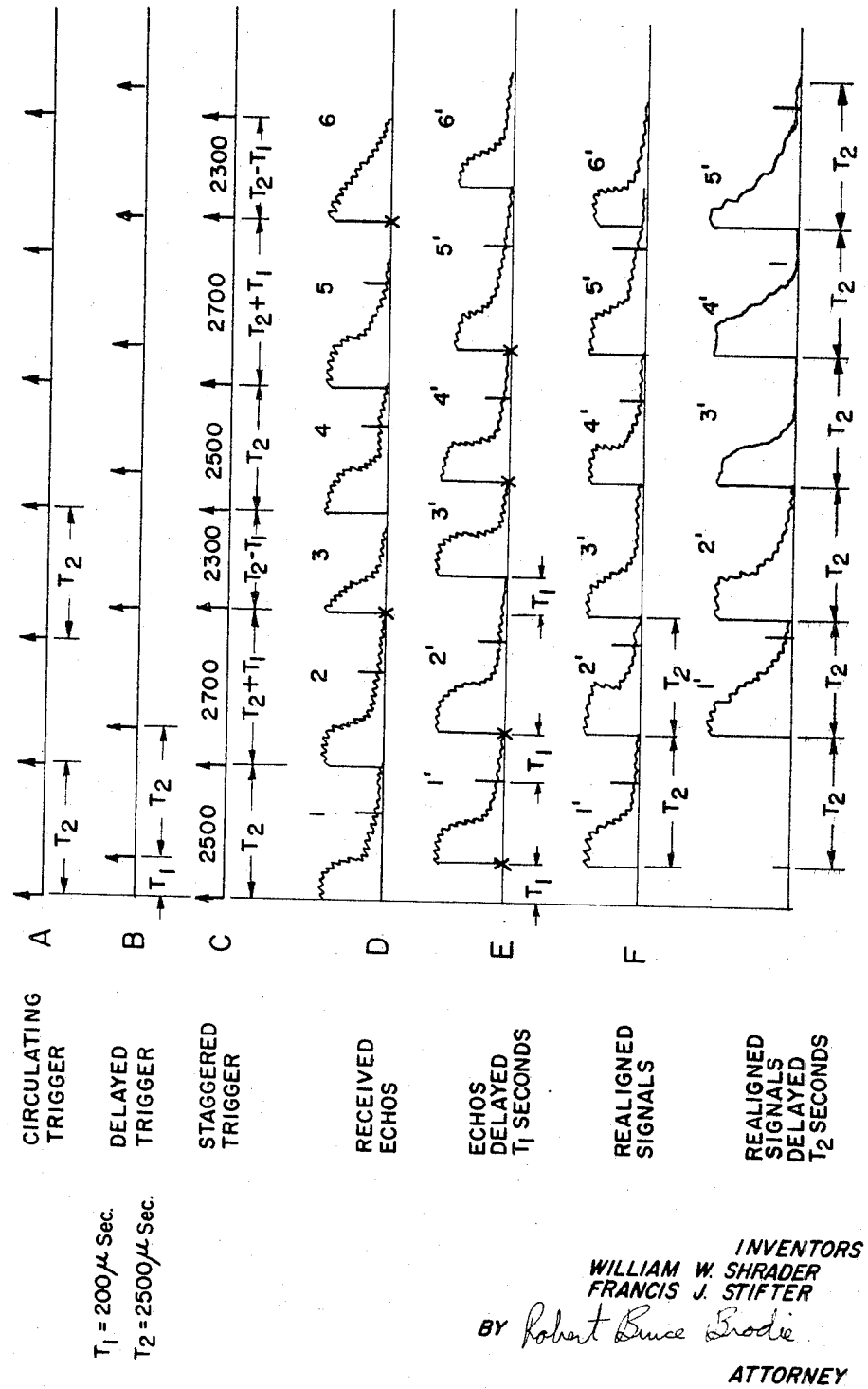

ABSTRACT OF THE DISCLOSURE

A moving target indication system including a radar receiver operable with a transmitter which radiates pulses at staggered repetition rates. The receiver includes a delay line canceller operative in the intermediate frequency stages. The receiver further includes a first mixing arrangement for rephasing the system by generating a frequency difference signal between each radar return signal and a reference signal. The multiple delay line canceller forms a phase difference signal between each frequency difference signal and a frequency difference signal delayed by at least one transmitter interpulse interval. A second mixing arrangement, also in the receiver, keeps the reference signal coherent in phase with each transmitted pulse and the phase difference signal so that the system is automatically rephased.

Background of the invention

This invention relates to moving target indicator systems and more particularly, to moving target indicator systems having delay line cancellers adapted for staggered transmitter pulse repetition rate operation.

Moving target indicator systems (MTI) discriminate against stationary targets so that moving targets, which may be masked in a normal system, can be detected. Target motion in a direction radial to a MTI system, is extracted from successive radar return signals by comparing the relative phase change between the successive return signals, the phase difference between each pulse and a reference signal being represented as an amplitude. The relative phase change information is extracted from successive radar return pulses by subtracting for example the magnitude of each present pulse from the magnitude of a delayed precessor pulse at a common point. Typically, such a system uses a comparator to which both a delayed and undelayed pulse are applied. Reference is made to U.S. Patent 3,134,101 issued to F. R. Dickey on May 19, 1964 which shows such a system.

The comparators, also termed delay line cancellers, have relative gain versus frequency response curves which are similar in shape to fully rectified sine waves. The system is "blind" to targets moving at integral multiples of the "notch frequencies." The "blindness" may be avoided by changing the transmitter pulse repetition rates. If the transmitter pulse repetition rates were staggered, the notch frequencies to which the system does not show relative gain also changes. This was recognized and incorporated in a moving target indication system as early as 1946. See, for example, U.S. Patent 2,840,808 issued to W. R. Woodward on June 24, 1958.

Prior art delay line cancellers were interposed in radar receivers at a point in the information handling process after the initial phase information had been extracted. The question arises as to whether such cancellation could be performed prior to the extraction of phase information at a point where circuit simplicity and convenience are present. That is, could cancellation be performed at the intermediate frequency stage in the radar receiver. In this regard, intermediate frequency (IF) merely designates the result of the heterodyning process when a radar return signal first enters the receiver.

One example of a prior art IF phase canceller appears in the transaction of the IEEE International Convention Record for 1965 on page 170, FIG. 3 in an article entitled, "Performance Characteristics of Coherent, Phase Only, MTI Cancellation," by Donald Schulkind. This reference is directed to clutter cancellation schemes for coherent *non-staggered* transmitter pulse repetition rate MTI systems.

It is, accordingly, an object of this invention to devise an efficient moving target indicator system including a radar receiver operable with a transmitter which radiates energy pulses at staggered repetition rates.

It is a further object of this invention that the radar receiver include a delay line canceller responsive to signals in the intermediate frequency range and be capable of automatic rephasing.

Summary of the invention

The above objects of this invention are attained in a system comprising a transmitter for radiating energy pulses at staggered repetition rates and a receiver. The receiver includes a first mixing arrangement for rephasing the system by generating a frequency difference signal between each radar return signal and a reference signal. The receiver further comprises a multiple delay line canceller circuit for forming a phase difference signal between each frequency difference signal, and a frequency difference signal which has been delayed by at least one transmitter interpulse interval. A second mixing arrangement within the receiver is used for forming the reference signal coherent in phase with each transmitter and the phase difference signal.

The first mixer provides the phase discrimination prior to the application of a radar return signal to the multiple delay line canceller circuit. The use of multiple delay lines permits matching the interpulse delay interval to the corresponding radar return signal. A second mixer forms the reference signal in phased coherence with each transmitter pulse and the phase difference signal.

The multiple delay line canceller circuit has a first delay element equal to a first interpulse interval. A second delay element may be algebraically combined with the first delay element to form a delay equal to yet another interpulse interval. If the second delay element is set equal to an incremental value, a triple staggered pulse repetition system may be formed through the use of only two delay elements. The delay elements may be electrically combined by any ordinary switch responsive to any internal clock.

The second mixing arrangement forms the reference signal through heterodyning of two oscillators. A first oscillator resonates at a frequency varying as the phase difference signal varies. The mixing arrangement beats the first oscillator frequency against the frequency contents of the current sampled transmitter pulse. A second oscillator generates the reference signal responsive to the heterodyne frequency difference signal. As a consequence, the phase relationship between the reference signal and each transmitter sampled pulse as well as the phase difference signal may be adjusted on a pulse-by-pulse basis. This arrangement is analogous to a phase lock loop.

In another embodiment of the second mixing arrangement there is also included a phase shifter for altering phase in the feedback path where the phase shift varies with the phase difference signal as sampled in a periodic manner. Likewise, the resonance frequency of the first oscillator is made to vary with the phase difference signal as sampled in a periodic manner. This arrangement permits locking onto the ground clutter return signals as a reference level thereby blocking them from the system.

Brief description of the drawings

FIG. 1 is a block diagram representation of the invention interposed at the IF signal stage.

FIG. 2 represents a prior art video delay line canceller.

FIG. 3 exhibits a preferred embodiment of the invention using time gated feedback.

FIG. 4 shows a preferred embodiment using time gated feedback and an alternative phase shifting compensation arrangement.

FIG. 5 is a timing and wave form diagram of the signal processing at selected nodes of the embodiment shown in FIG. 3.

Description of the preferred embodiment

The embodiments shown in FIG. 1 and FIG. 3 may be more properly appreciated with reference to discussion of the prior art as exhibited in FIG. 2. In FIG. 2 there appears a delay line canceller operative in the "video" frequency range. Each radar return signal obtained by antenna 1 has the phase information converted into amplitude information at the phase detector 20 prior to the application of the radar return signal to node 10. Delay line 15 provides a delay interval equal to the inverse of the transmitter pulse repetition frequency. The delayed and undelayed amplitude pulses are respectively applied to subtractor 8 over lines 16 and 17. The subtractor yields the appropriate phase difference information. Such a system exhibits a relative gain versus frequency response as a fully rectified sine wave. This system is "blind" to those targets having radar return pulses with Doppler frequencies identical to the notch frequencies in the response characteristic.

In FIG. 1, each radar return pulse is detected at antenna 1 and translated down to an IF frequency by mixer 2. Amplifier 3 is used for gain and isolation. A first mixing arrangement 25 provides phase discrimination between each radar return signal and a reference signal by the formation of a suitable amplitude modulated frequency difference signal. This AM signal is applied to a multiple delay line 15 at node 10. Transmitter 4a is conveniently coupled to duplexer 4c. The duplexer is interposed between antenna 1 and mixer 2. The conversion down to the IF frequency is achieved by beating the received radar return signal applied to mixer 2 against a reference frequency. The reference frequency is applied to the mixer 2 from local oscillator LO over path 6a.

Delay line 15 may comprise a first delay element 13 and a second delay element 14 of the same or unequal delay lengths. In the illustrative embodiment, two unequal delay elements are used with a triple staggered transmission pulse repetition rate. Let $T_2$ designate the intermediate interpulse interval, and let $T_1$ designate an arbitrary incremental interval (where $T_1$ is less than $T_2$), then $T_2-T_1$ designates the smallest interval, with $T_2+T_1$ designating the largest interval.

In the embodiment, delay element 13 represents the incremental delay, while element 14 represents the intermediate delay $T_2$. The frequency difference signal applied at node 10 may be selectively delayed $T_2$ seconds, or $(T_2+T_1)$ seconds by the operation of switch S1. When switch S1 is in position 18, phase deetctor 20 has applied to it a delayed frequency difference signal and an undelayed frequency difference signal. When S1 is in position 19, the signal on line 16 has been delayed $T_1$ seconds. By appropriate switching of S1, a signal on line 17 has been delayed either $T_2$ or $T_1+T_2$ seconds.

Switch S1 may be driven by any internal clock to alternate between terminals 18 and 19 to present signals of different delay at the inputs of phase detector 20. In this regard, the internal clock is instrumented in the form of the transmitter 4a from which transmitter pulses may be sent on conductor 7a to switch S1 actuating unit 7d. Switch actuating unit 7d may be any one of a number of well known devices such as electromagnetic actuators in the form of multiple windings and associated circuitry. Phase detector 20 may be either a conventional subtractor or a phase discriminator. A phase discriminator is preferable to a conventional subtractor in that the discriminator may be operated in non-linear regions, whereas the subtractor is limited to linear operation. An amplitude representing the difference between each successive pair of delayed and undelayed frequency difference signals is applied to a video output over conductor 21 and to a second mixing arrangement 50 over feedback path 22.

The second mixing arrangement 50 comprises a first oscillator 30 whose resonant frequency varies as an applied voltage, a second oscillator 40, and a mixer 35. The second mixing arrangement is used for keeping the reference signal in coherence with both the phase of each transmitted sampled signal and the phase difference signal appearing on feedback path 22. The oscillator 40 is used to lock onto the sampled transmitter pulse while the first oscillator 30 compensates for the built-in system errors. The change in magnitude of the phase difference signal applied via feedback path 22 alters the resonant frequency of the first oscillator 30. A frequency difference signal is obtained by beating the frequency contents of each sampled transmitter pulse against the first oscillator frequency. This signal is applied to the second oscillator 40. This, in turn, alters the second oscillator phase thus advancing or retarding the phase of the reference signal. Mixer 4b interconnects mixer 35 and transmitter 4a. Each transmitter pulse applied to mixer 4b over path 7b is beat against a reference signal from local oscillator LO applied to the mixer over path 6b.

It is well known that the ground clutter return appearing at the beginning of each radar return interval has approximately the same Doppler frequency content as the ground clutter caused by objects substantially distant from the radar. The feedback path connection permits the system to lock onto the ground clutter as a reference. Deviations from this reference are highly detectable and most likely represent a desired target return. The real time adjustment ensures the maintenance of the proper phase discrimination.

It is noted in passing that appropriate phase compensation is a necessary adjunct for satisfactorily balancing any closed feedback system.

FIG. 3 shows another embodiment of the invention emphasizing time gated feedback compensation. A phase shifter 33 is interposed between mixer 35 and the voltage responsive first oscillator 30. Theoretically, the phase shifter could be inserted anywhere in the loop, as for example, between the delay lines and the first mixer. It could also be inserted as shown in FIG. 4. FIG. 4 is included only for purposes of illustration, since it is not a preferred embodiment. Thus it is convenient to include the phase shifter in the return loop modifying the first oscillator 30 output as seen in FIG. 3.

The phase shifter output could also be coupled directly to the first mixing arrangement 25 if the system was a fully coherent MTI radar. The fully coherent radar is one having the transmitter locked onto an internal phase reference thereby dispensing with a coherence reference oscillator and the receiver sampling of the transmitted pulse. An example of a coherent system is set forth in "Introduction to Radar Systems," by Skolnik, McGraw-Hill, 1964, page 117, Fig. 4.5.

Again considering FIG. 3, a first holding circuit 23 (i.e. a diode clamped capacitor) is connected to first oscillator 30. A second holding circuit 24 is coupled to phase shifter 33 through gate S3. Gate S2 couples the input of holding circuit 23 to feedback path 22 and gate S4 couples the input of holding circuit 24 to feedback path 22. Thus the inputs to both holding circuits are connected to a common node 26 on feedback path 22. An understanding of time gated feedback (FIG. 3) and its coaction with the delay elements will be facilitated by the following remarks concerning the manner by which staggering of interpulse intervals is obtained as described with regard to FIG. 5.

A two period staggered pulse repetition frequency can easily be generated with a short delay line (relative to the average interpulse interval) by switching the delay line into and out of a signal path on alternate pulses. If the transmitter trigger is also put through this same delay element on alternate pulses, the transmitter is pulsed at a staggered rate. A *three period stagger* can be obtained using *two delay elements* (FIG. 3), as previously mentioned. The three pulse intervals are shown, for example, in FIG. 5 as the staggered trigger C. The production of the three unequal intervals equal to an intermediate interval $T_2 \pm$ an incremental interval $T_1$ is related to the overlap of intervals shown in A and B of FIG. 5. A circulating trigger defining successive interpulse intervals of $T_2$ seconds duration is delayed by $T_1$ seconds. A second and overlapping (B) interpulse definition is thereby created.

Interval $T_2$ is defined by any two successive pulses in sequence A on FIG. 5. Interval $T_2+T_1$ is initiated by a first pulse in series A and terminated on a subsequent second successive pulse from series B. Interval $T_2-T_1$ is initiated by a pulse in series B and terminated by the next successive pulse in series A. In FIGS. 1 and 3, the incremental delay line 13 is switched "in" or "out" in two out of every three intervals. That is, the incremental delay is either additive or subtractive with respect to defining the desired delay. Error in the delay caused by such factors as component aging and temperature may be additive or subtractive to the magnitude of phase difference as measured by phase detector 20. In this regard, the delay error associated with delay element 14 is always biased in the same direction. In contrast, the alternation of the direction of error associated with element 13 must be considered a high frequency or short term compensation problem because element 13 is combined in two out of three intervals.

Reference is again made to FIG. 1. The configuration shown in this drawing provides effective compensation for the drift associated with delay element 14. This is achieved by varying the resonant frequency of the first oscillator 30 as the voltage of the phase difference signal on conductor 22 varies. However, in view of the fact that the system is staggered, it is necessary to sample and compensate for the effects of drift in the incremental delay line (element 13) at periodic intervals. This is implemented in FIG. 3 by phase shifter 33, synchronizer 45, and a gated control circuit formed by switch S4, switch S3 and holding circuit 24 connected to the phase shifter. Operatively, at every third interval $(T_2-T_1)$ synchronizer 45 gates switch S3 and switch S4 "on" by biasing line 29 and line 31. The phase difference signal sensed by holding circuit 24 is directly coupled to phase shifter 33 the phase being varied directly.

At every third interval $(T_2+T_1)$ synchronizer 45 gates switch S2 "on" by biasing line 28. The phase difference signal sensed by holding circuit 23 varies the frequency of first oscillator 30 to compensate for the effect of drift associated with delay element 14.

Because the radar return signals (pulses) represent targets at different ranges, it is necessary to realign pulses so that targets at a given range are related to the same constant time reference. This realignment may be conveniently performed by the embodiments in FIGS. 1 and 3 as illustrated in the timing diagrams of FIG. 5.

The illustrative realignment problem consists of repositioning echo 3 in pulse sequence D so that it occurs earlier in the time interval $T_2-T_1$. The nonalingment of echo 3 is illustrated in pulse sequence E. The realignment is obtained by resequencing the initiation and termination of the $T_2-T_1$ interval. This is governed by the circulating and staggered trigger sequences A and B as discussed previously. Thus 3' can be realigned by initiating its interval $T_1$ seconds earlier. In summary, a first embodiment has been shown in which a delay line canceller can be made operative in the intermediate frequency stages of an MTI radar system using staggered transmission pulse repetition rates. This is accomplished in the first embodiment by using a second mixing arrangement in a feedback path defined by the canceller output and an input phase discriminator (first mixing arrangement). The second mixing arrangement maintains the reference signal (used by the first mixing arrangement) in phase coherence with the canceller output and the frequency contents of each sampled transmitter pulse. In order to reduce the effects of error caused by component aging and drift, particularly in the delay line elements, the feedback path is modified in a second embodiment to incorporate the sampling of a portion of the canceller output at periodic intervals. Since error may occur more frequently in one of two delay elements and vary either positive or negative, it is compensated for by the phase shifting in the feedback path. Both the rephasing of the system as well as compensation for error or drift, occurring in the other of the delay elements, is accomplished substantially as shown in the first embodiment of the invention except as modified by the requirement for time gating.

We claim:
1. A moving target indication system comprising:
   a transmitter for radiating energy pulses at staggered repetition rates; and
   a receiver comprising:
   a first mixing arrangement for rephasing the system generating a frequency difference signal between each radar return signal and a reference signal;
   a multiple delay line canceller circuit for forming a phase difference signal between each frequency difference signal and a frequency difference signal delayed by at least one transmitter interpulse interval; and
   a second mixing arrangement for maintaining the reference signal coherent in phase with each transmitter pulse and the phase difference signal.

2. A moving target indication system according to claim 1, characterized in that the multiple delay line canceller comprises:
   a plurality of delay elements at least one of which being in coupling relation to the first mixer, the delay of each element corresponding to a distinct interpulse interval; and
   switching means responsive to transmitter pulses for combining delay elements to form the preselected interpulse delay interval.

3. A clutter canceller in combination with an MTI radar having staggered transmitter pulse repetition periods comprising:
   a first mixing arrangement for forming a frequency difference signal from a reference signal and each radar return signal;
   a plurality of delay elements at least one of which being in coupling relation to the first mixing arrangement, the delay of each element corresponding to a distinct interpulse interval;
   a phase detector for forming a phase difference signal between the frequency difference signal and the output from preselected delay elements;
   a second mixing arrangement for forming reference signals coherent in phase with corresponding transmitter pulses and the phase difference signals; and
   switching means responsive to transmitter pulses for combining delay elements to form delays corresponding to interpulse intervals.

4. A moving target indication system comprising:
   a transmitter for radiating energy pulses at staggered repetition rates; and
   a receiver comprising:
   a first mixing arrangement for generating a frequency difference signal between each radar return signal and a reference signal;

a delay line canceller circuit having a first delay element equal to a first interpulse interval and a second delay element algebraically combinable with the first delay element equal to yet another interpulse interval, the canceller circuit forming a phase difference signal between the frequency difference signal and a frequency difference signal as delayed by a preselected one of the interpulse intervals; and a second mixing arrangement for forming the reference signal coherent in phase with each transmitted pulse and phase difference signal.

5. A moving target indication system comprising:
a transmitter for radiating energy pulses at staggered repetition rates; and
a receiver comprising:
  a first mixing arrangement for generating a frequency difference signal between each radar return signal and a reference signal;
  a multiple delay line canceller circuit for forming a phase difference signal between each frequency difference signal and a frequency difference signal delayed by at least one transmitter interpulse interval; and
  a second mixing arrangement including a time gated feedback arrangement for forming the reference signal coherent in phase with each transmitter pulse and the average sampled value of the phase difference signal.

6. A moving target indication system according to claim 5, characterized in that the second mixer including the time gated feedback arrangement comprises:
  means for sampling a portion of each transmitter pulse;
  a first oscillator having a frequency varying as the phase difference signal;
  a heterodyne for beating the first oscillator frequency against the frequency contents of each sampled transmitter pulse;
  a second oscillator for generating the reference signal responsive to the heterodyne frequency difference signal;
  first gating and sampling means for applying the sampled average phase difference signal occurring at periodic interpulse intervals to the first oscillator; and
  means for altering the first oscillator phase responsive to the gated time average of the phase difference signal occurring at another periodic interpulse interval.

References Cited

UNITED STATES PATENTS

| | | | |
|---|---|---|---|
| 2,840,808 | 6/1958 | Woodward | 343—7.7 |
| 3,169,243 | 2/1965 | Kuhrdt | 343—7.7 |
| 3,273,147 | 9/1966 | Herscovici | 343—7.7 |

RODNEY D. BENNETT, *Primary Examiner.*

C. L. WHITHAM, *Assistant Examiner.*